US010169353B1

(12) United States Patent
Riley et al.

(10) Patent No.: US 10,169,353 B1
(45) Date of Patent: Jan. 1, 2019

(54) GROUPING DOCUMENTS BASED ON DOCUMENT CONCEPTS

(71) Applicant: United Services Automobile Association (USAA), San Antonio, TX (US)

(72) Inventors: Timothy L. Riley, San Antonio, TX (US); Barrington R. Young, Austin, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 358 days.

(21) Appl. No.: 14/926,719

(22) Filed: Oct. 29, 2015

Related U.S. Application Data (60) Provisional application No. 62/072,689, filed on Oct. 30, 2014.

(51) Int. Cl.
*G06F 17/30* (2006.01)
*G06F 17/27* (2006.01)

(52) U.S. Cl.
CPC ...... *G06F 17/30106* (2013.01); *G06F 17/277* (2013.01); *G06F 17/30011* (2013.01); *G06F 17/30112* (2013.01); *G06F 17/30401* (2013.01)

(58) Field of Classification Search
CPC .................................................. G06F 17/2735
USPC ............................... 707/758, 780; 715/277
See application file for complete search history.

(56) References Cited

U.S. PATENT DOCUMENTS

| | | | | |
|---|---|---|---|---|
| 6,493,663 | B1* | 12/2002 | Ueda | G06F 17/271 704/9 |
| 7,041,097 | B1* | 5/2006 | Webler | A61B 17/3403 600/434 |
| 7,346,844 | B1* | 3/2008 | Baer | G06Q 30/0603 434/362 |
| 7,613,993 | B1* | 11/2009 | Baer | G06F 17/2229 707/999.001 |
| 8,046,348 | B1* | 10/2011 | Rehling | G06F 17/30386 707/603 |
| 9,934,285 | B1* | 4/2018 | Rehling | G06F 17/3053 |
| 2002/0178155 | A1* | 11/2002 | Sakurai | G06F 17/30616 |
| 2007/0174255 | A1* | 7/2007 | Sravanapudi | G06F 17/30707 |
| 2009/0228445 | A1* | 9/2009 | Gangal | G06F 17/30539 |
| 2014/0350961 | A1* | 11/2014 | Csurka | G16H 10/60 705/3 |
| 2015/0310177 | A1* | 10/2015 | Csurka | G06N 5/04 706/50 |

\* cited by examiner

*Primary Examiner* — Baoquoc N To
(74) *Attorney, Agent, or Firm* — Fish & Richardson P.C.

(57) ABSTRACT

Methods, systems, and apparatus, including computer programs encoded on a computer storage medium, for receiving at least one electronic document, and identifying one or more words, phrases, or patterns used within the electronic document and that are based on a lexicon. Mapping, using a concept library, the one or more words, phrases, or patterns to a concept intended to be conveyed by the one or more words, phrases, or patterns according to the lexicon. Generating concept data based on the mapping, and storing the concept data in association with data identifying the electronic document.

20 Claims, 4 Drawing Sheets

GROUPING DOCUMENTS BASED ON DOCUMENT CONCEPTS

CROSS-REFERENCE TO RELATED APPLICATION

This application claims the benefit of the filing date of U.S. Provisional Application No. 62/072,689, filed on Oct. 30, 2014. The contents of U.S. Application No. 62/072,689 are incorporated herein by reference in their entirety.

BACKGROUND

Various individuals may convey similar abstract concepts using different words and phrases based on each individual's pre-dispositions and manners of thinking about the concepts. Categorization, searching, and comparison of documents based on abstract concepts becomes difficult and imprecise using traditional methods due to the differing ways that various authors of documents think about and describe similar topics.

SUMMARY

This specification relates to categorizing electronic textual documents based on concepts extracted from the documents.

Implementations of the present disclosure generally extract concepts conveyed using various different lexicons from electronic textual documents. More particularly, implementations of the present disclosure are directed to identifying in documents words, phrases, or patterns of words and phrases, specific to a variety of differing lexicons, that are intended to convey similar concepts; and to map the identified words, phrases, and patterns of words and phrases to the intended concepts using a set of concept libraries. In some implementations, concept data identifying the concepts conveyed within each document is then generated and stored in association with the data identifying the documents with which the concept data is associated. In some implementations, the concept data may include a measure of the strength or weight of individual concepts in relation to other concepts.

In general, innovative aspects of the subject matter described in this specification can be embodied in methods that include actions of receiving at least one electronic document, and identifying one or more words, phrases, or patterns used within the electronic document and that are based on a lexicon. Mapping, using a concept library, the one or more words, phrases, or patterns to a concept intended to be conveyed by the one or more words, phrases, or patterns according to the lexicon. Generating concept data based on the mapping, and storing the concept data in association with data identifying the electronic document. Other implementations of this aspect include corresponding systems, apparatus, and computer programs, configured to perform the actions of the methods, encoded on computer storage devices.

These and other implementations can each optionally include one or more of the following features. In some aspects, the concept library may include at least one lexicon having a plurality of context entries, where each context entry has a set of one or more words, phrases, or patterns and is mapped to at least one concept intended to be conveyed by the set of one or more words, phrases, or patterns of the respective context entry. The concept library may be one of a product library, a product feature library, a line of business library, or a life events library. The lexicon maybe one of a customer lexicon, a customer service representative lexicon, a legal staff lexicon, a marketing staff lexicon, or a technical staff lexicon.

The concept data may include binary data associated with each concept represented in the concept library, where the binary data indicates that a respective concept is either present or not present in the at least one electronic document. The concept data may include a concept score for each concept represented in the concept library, where each concept score indicates a frequency with each respective concept is conveyed in the at least one electronic document.

The methods may further include the actions of determining a set of concepts that are conveyed in both a first and a second electronic document based on comparing concept data associated with the first electronic document to concept data associated with the second electronic document, and providing, for display to the user, the set of concepts that are conveyed in both a first and a second electronic document in response to receiving a user request to compare the first and the second electronic document.

The methods may further include the actions of determining a set of concepts that are conveyed in a first electronic document but that are not conveyed in a second electronic document based on comparing concept data associated with the first electronic document to concept data associated with the second electronic document, and providing, for display to the user, the set of concepts that are conveyed in a first electronic document but that are not conveyed in a second electronic document in response to receiving a user request to compare the first and the second electronic document.

Particular implementations of the subject matter described in this specification can be implemented so as to realize one or more of the following advantages. Implementations may enable efficient and consistent categorization of large quantities of electronic textual documents across various lexicons. Implementations may permit comparisons of electronic textual documents at an abstracted conceptual level notwithstanding variations in words and phrases used to convey similar concepts within the documents. Implementations may allow rapid searches for documents relating to specific concepts among large quantities of documents notwithstanding variations in words and phrases used to convey similar concepts within the documents.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Implementations of the present disclosure generally extract concepts conveyed using various different lexicons from electronic textual documents. More particularly, implementations of the present disclosure are directed to identifying in documents words, phrases, or patterns of words and phrases, specific to a variety of differing lexicons, that are intended to convey similar concepts; and to map the identified words, phrases, and patterns of words and phrases to the intended concepts using a set of concept libraries. In some implementations, concept data identifying the concepts conveyed within each document is then generated and stored in association with the data identifying the documents with which the concept data is associated. In some implementations, the concept data may include a measure of the strength or weight of individual concepts in relation to other concepts.

Figure 1:
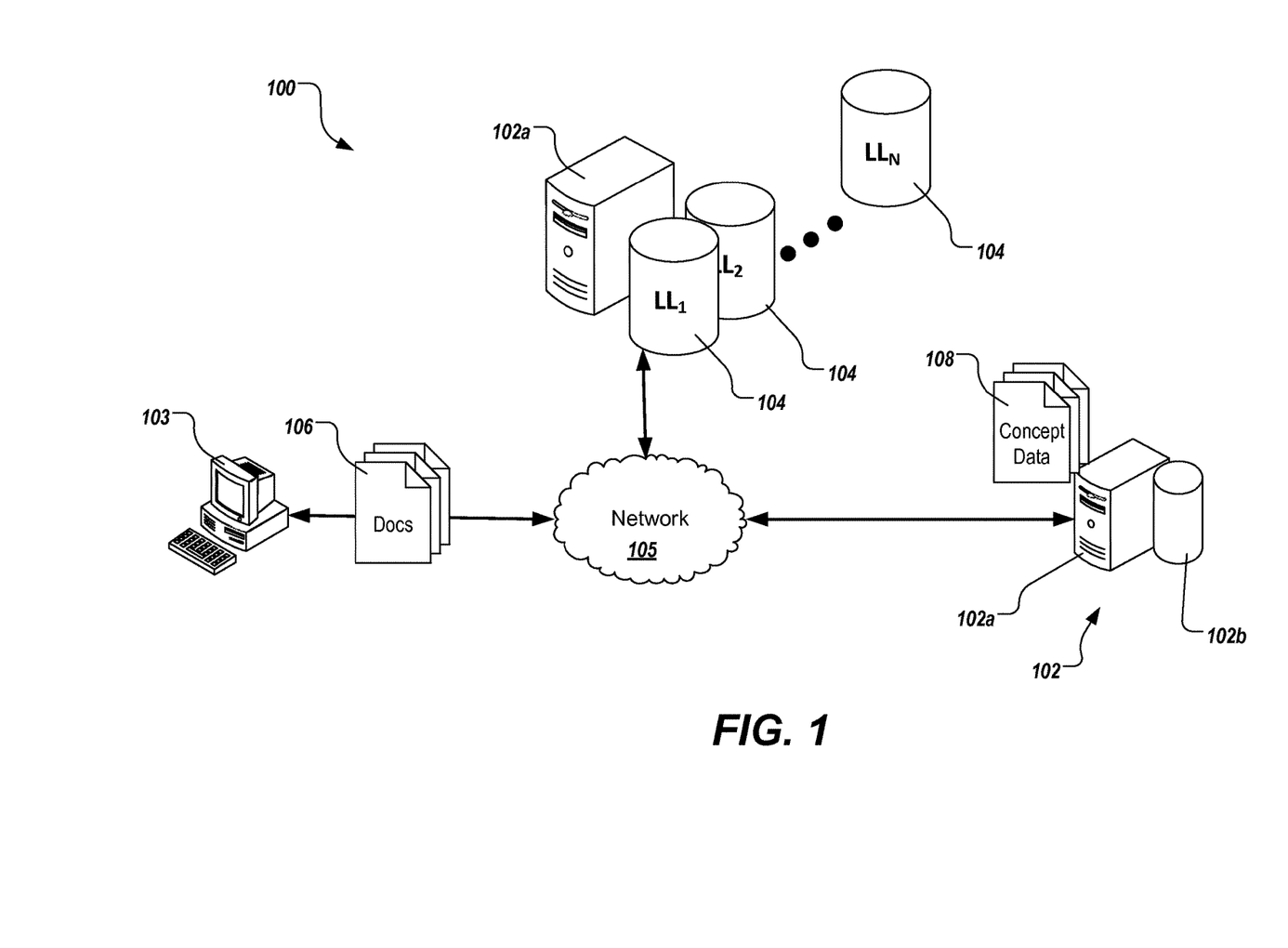
FIG. 1 depicts an example system in accordance with implementations of the present disclosure.

FIG. 1 depicts an example system 100 that can execute implementations of the present disclosure. The example system 100 includes computing system 102 in communication with user computing device 103 and concept libraries 104 through a network 105. The computing system 102 can include a computing device 102a and computer-readable memory provided as a persistent storage device 102b, and can represent various forms of server systems including, but not limited to, a web server, an application server, a proxy server, a network server, or a server farm. Computing devices can be any type of user computing device including, but are not limited to, one or more desktop computers, laptop computers, notebook computers, tablet computers, and other appropriate devices. Network 105 can include a large network or combination of networks, such as a local area network (LAN), wide area network (WAN), the Internet, a cellular network, a satellite network, one or more wireless access points, or a combination thereof connecting any number of mobile clients, fixed clients, and servers.

As described in more detail below in reference to FIG. 2, each concept library 104 includes a group of related concepts and contextual lexicon entries related to each concept. A concept library 104 maps one or more different user lexicons into a common set of concepts defined within the library 104. Concept libraries 104 may define concept groups including, but not limited to, products, product features, lines of business, business organizational units, communication channels (e.g., telephone, internet, kiosk, etc.), computer systems/devices, application software, life events, or other appropriate concepts of interest.

In some examples, one or more of the concept libraries 104 may be stored on the persistent storage device 102b of computing system 102. In some examples, the concept libraries 104 may be stored in one or more databases on other persistent storage devices accessible to computing system 102 through network 105. In some implementations, the concept libraries 104 may be stored in one or more cloud databases on other persistent storage devices accessible to computing system 102 through network 105.

The concept libraries 104 may be used by computing system 102 to automatically and consistently categorize documents 106 based on concepts conveyed within the documents notwithstanding specific user lexicons used within each document to describe the concepts. Documents 106 may include any type of electronic text document, including but not limited to, word processor files, portable document files, e-mails, chat conversations, speech to text transcriptions, or website or user application text entry forms, for example.

Computing system 102 may use one or more libraries 104 to identify various concepts defined within a library 104 based on specific words, phrases, and/or patterns of words and phrases contained within a document 106 that map to the defined concepts. The computing system 102 then may generate concept data 108 (described in more detail below with reference to FIG. 3) that identifies one or more concepts conveyed within the document 106 or within each document in a set of documents. The concept data 108 may be used to categorize, compare, or search the various documents 106 based on one or more standard sets of concepts as defined by concept libraries 104.

For example, a concept library 104 may define a group of products and map those products to words, phrases, or patterns of words and phrases used by customers, customer service representatives (CSR), legal staff, and engineers to describe each of the defined products. A user may send a group of documents 106 to computing system 102 to extract concept data 108 related to each of the documents 106 (e.g., from computing device 103 through network 105). Moreover, individual documents within the group of documents 106 may include text generated by customers, CSRs, legal staff, and engineers, each of which use a different lexicon. Computing system 102 can use the example product concept library 104 to identify various products described within each document notwithstanding differing lexicons that may be used in individual documents. Then, computing system 102 can generate concept data 108 for each document that identifies the products described in the individual documents regardless of the lexicon used to describe the products. The computing system 120 may then use the concept data 108 to categorize the documents by product, to compare documents across differing lexicons, or to perform user searches of the documents using a standardized concept searching index. In some implementations, the concept data 108 may allow for more efficient use of computing resources when system 102 performs functions such as document categorization, comparison, and searching. In some examples, the concept data 108 may be stored in one or more databases on other persistent storage devices accessible to computing system 102 through network 105. In some implementations, the concept data 108 may be stored in one or more cloud databases on other persistent storage devices accessible to computing system 102 through network 105.

Figure 2:
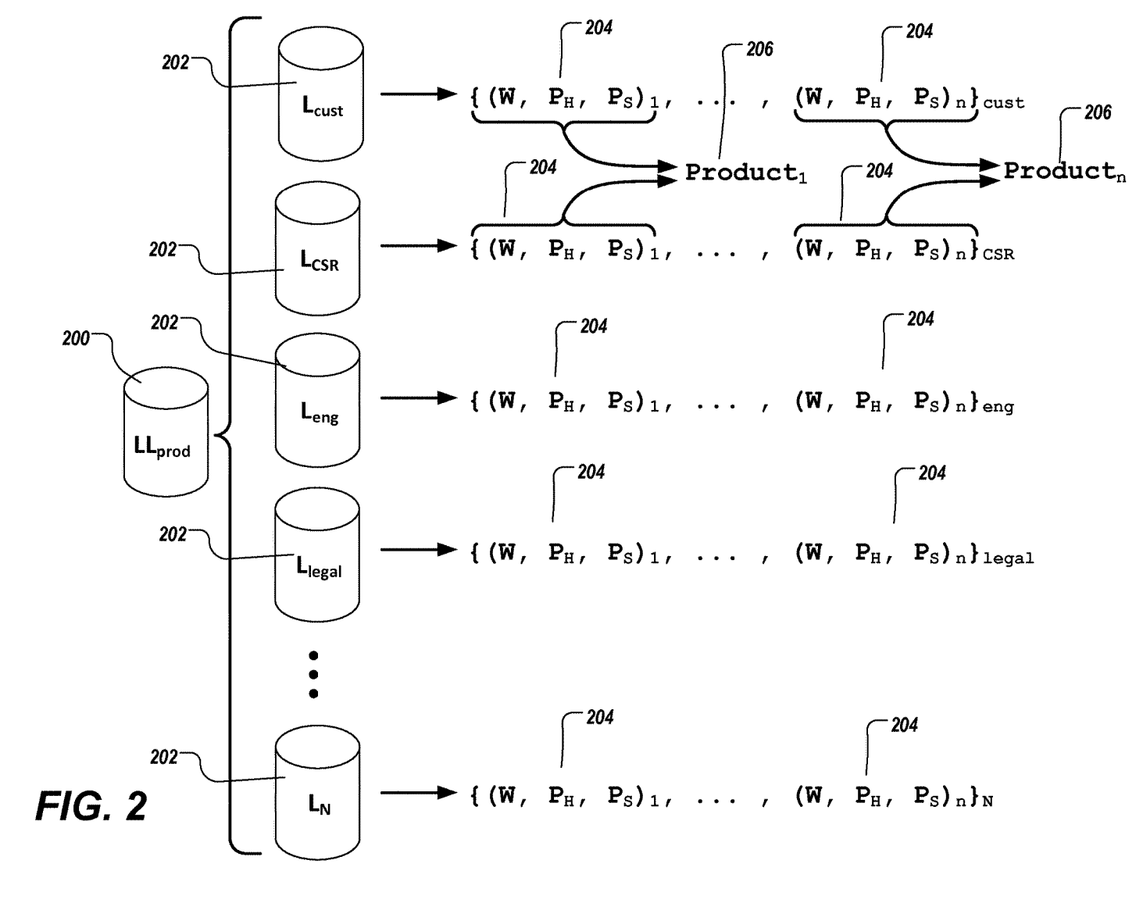
FIG. 2 depicts a graphical representation of an example concept library.

FIG. 2 depicts a graphical representation of an example concept library 200. As noted above, concept libraries 200 may be used (e.g., by computing system 102) to map concepts or groups of concepts to combinations of words, phrases and/or patterns of words and phrases used within different lexicons to describe the similar or the same concepts. For example, a library 200 may be generated to map words, phrases, or patterns of words and phrases used by customers (e.g., a lexicon) to describe various products offered by a business to the specific products (e.g., the concepts). Further, the various words, phrases, or patterns of words and phrases used by members of a legal department to describe the same set of products may be different from those used by the customers. Thus, the library 200 also may map words, phrases, or patterns of words and phrases used by legal staff (e.g., another lexicon) to describe the same products to the specific products. In some examples, a library 200 may be generated to map multiple different lexicons to any particular group of concepts including, but not limited to, products, product features, lines of business, business organizational units, communication channels, computer systems/devices, application software, life events, or other appropriate concepts.

More specifically, a concept library 200 includes one or more lexicons 202, each of which includes multiple context entries 204. Each context entry 204 may include a set of one or more words (W), phrases ($P_H$), patterns ($P_S$), or any combination of the three that may be used to describe a particular concept 206 in the related lexicon 202 (e.g., a customer lexicon). In other words, the lexicons 202 map various sets of words, phrases, and patterns used by speakers of the particular lexicon to concepts 206 that those words phrases, or patterns are intended, by users of the lexicon, to convey. Furthermore, each library may map the various lexicons 202 to a specific group of concepts 206 (e.g., products, product features, lines of business, etc.).

For example, lexicons 202 may be defined to map the various words, phrases, and patterns that are used by different groups of people (e.g., groups of people in different departments within an organization such as a business) to convey similar concepts 206 (e.g., products offered by the business). Lexicons 202 may include, but are not limited to, a customer lexicon ($L_{cust}$), a customer service representative (CSR) lexicon ($L_{CSR}$), an engineering department lexicon ($L_{eng}$), and a legal department ($L_{legal}$).

For example, FIG. 2 depicts an exemplary concept library 200 for a line of products ($LL_{prod}$), such as, for example, financial products. Products (concepts 206) defined in the product library ($LL_{prod}$) may include, for example, consumer loan, credit card, auto insurance policy, and home insurance policy. Taking the credit card as an example, when discussing a credit card, customers may tend to refer a business's credit card products as a "charge card," "credit card," "creditcard," or "payment card," for example. Referring to the same credit card product, customer service representatives may refer to the credit card products as "credit card," "mastercard," "master card," "visa," "amex," or "American Express." Referring again to the same credit card products, other groups (e.g., legal staff, engineers, and marketing staff) may use yet other words, phrases, or patterns to describe the products. Therefore, the product library ($LL_{prod}$) 1 includes each set of words, phrases, and patterns in corresponding context entries 204 (e.g., context entry (W, $P_H$, $P_s$)$_1$ for each respective lexicon 202 (e.g., $L_{cust}$–$L_N$), where the first context entry (W, $P_H$, $P_s$)$_1$ for each lexicon describes a first concept 206 (e.g., credit cards or product$_1$), and the nth context entry (W, $P_H$, $P_s$)$_1$ for each lexicon describes an nth concept 206 (e.g., product$_n$).

In some implementations, a concept library 200 may include only one lexicon 202. In such an implementation the various words, phrases, and patterns used by each different lexicon to describe a particular concept may be grouped together in a single context entry 204 and mapped to the particular concept. In other words, the context entries 204 for each different lexicon may be combined into a single entry as opposed to being divided into separate contextual entries, one for each different lexicon, as described above.

In some implementations, libraries 200 may be updated as the words, phrases, and patterns used within one or more lexicons to describe particular concepts change. For example, one or more computing systems may monitor changes in each lexicon and update corresponding libraries as appropriate. In some implementations, a library 200 may be updated to modify, add, or remove various concepts defined within the library. For example, as products change, new products are offered, and old products are discontinued.

In some implementation, one or more lexicons may be unique to a particular organization, for example, a business. The lexicon may represent words or phrases used internally by the business to describe products, product features, lines of business, and other business affairs in a manner that maintains confidentiality of the businesses internal processes.

Figure 3:
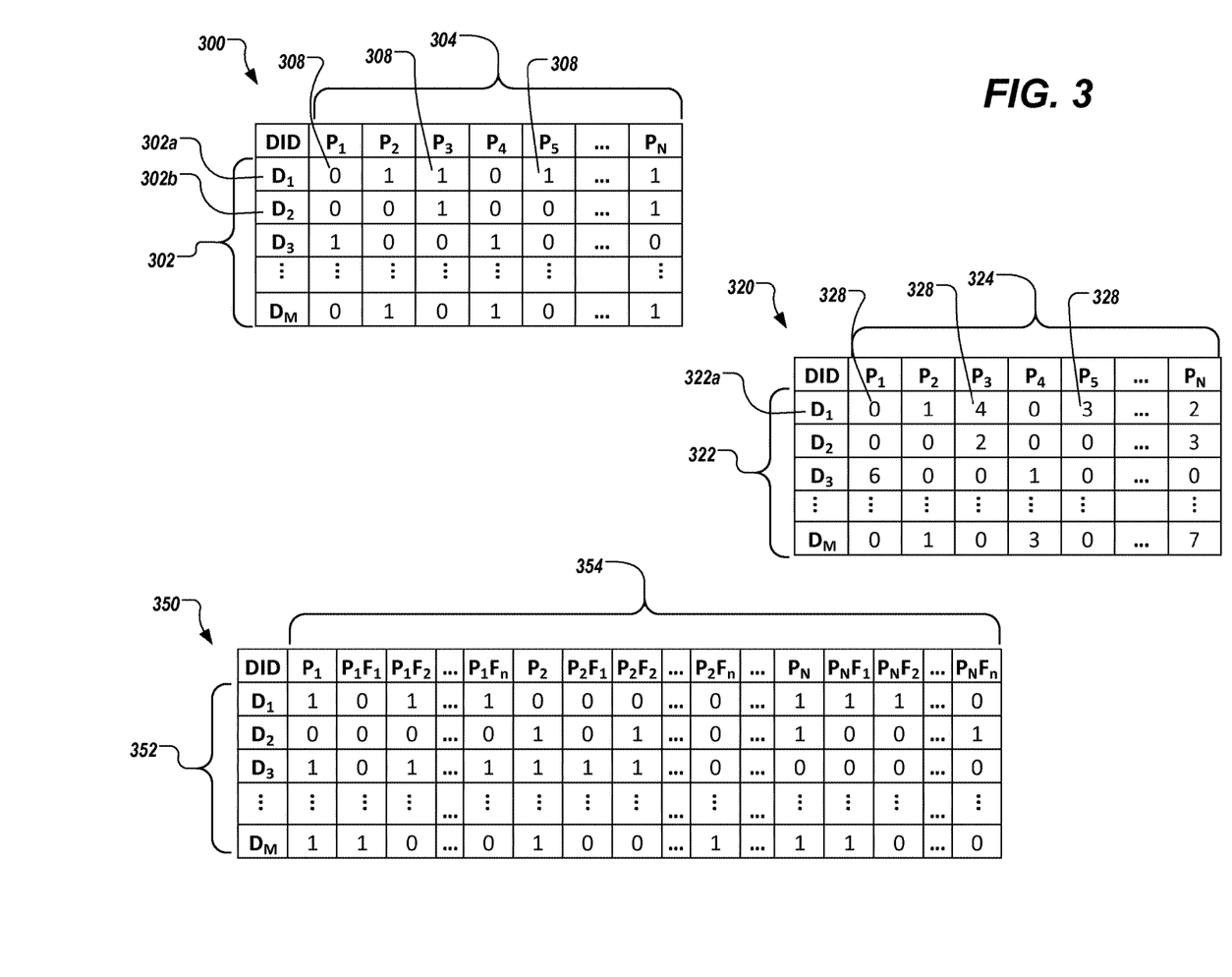
FIG. 3 depicts graphical representations of example concept data.

FIG. 3 depicts graphical representations 300, 320, 350 of example concept data (e.g., concept data 108). Concept data 108 may be generated by a computing system, such as computing system 102, to represent concepts conveyed within electronic documents using various different lexicons to describe the concepts.

Graphical representation 300 depicts concept data (cells 308) extracted from multiple documents ($D_1$-$D_M$) according to one implementation, where the rows 302 represent individual documents ($D_1$-$D_M$), and the columns 304 represent individual concepts ($P_1$-$P_N$). In graphical representation 300, the concept data 308 is represented as binary data, where a "1" indicates that a particular concept is conveyed within a particular document, and a "0" indicates that a particular concept is not conveyed within a particular document. For example, as depicted in graphic representation 300, concepts $P_2$, $P_3$, $P_5$, and $P_N$ are conveyed within document $D_1$ as indicated by the "1's" in the appropriate columns 304 of row 302a.

As described above, the concepts may represent various products ($P_1$-$P_N$) offered by a business, therefore, based on the concept data extracted for document $D_1$, the document may be categorized as describing products $P_2$, $P_3$, $P_5$, and $P_N$, irrespective of the lexicon used to describe products $P_2$, $P_3$, $P_5$, and $P_N$ in document $D_1$.

In addition, documents $D_1$ and $D_2$ may be compared based on their respective concept data, for example, to determine which concepts described in document $D_2$ are also described in document $D_1$. Based on comparing rows 302a and 302b it can quickly be determined that document $D_1$ describes all of the products (e.g., $P_3$ and $P_N$) described in document $D_2$, irrespective of the lexicons used in each document to describe the products.

Graphical representation 320 depicts concept data (cells 328) extracted from multiple documents ($D_1$-$D_M$) according to another implementation. Similar to graphical representation 300, in graphical representation 320 the rows 322 represent individual documents ($D_1$-$D_M$), and the columns 324 represent individual concepts ($P_1$-$P_N$). However, in graphical representation 320, the concept data 328 is depicted by scores, where a magnitude of a score represents the strength with which or frequency of which a concept is conveyed in a given document. For example, as depicted in graphic representation 320, products $P_2$, $P_3$, $P_5$, and $P_N$ are each described within document $D_1$ as indicated by the non-zero scores in the appropriate columns 324 of row 322a. However, based on the score magnitudes product $P_3$, with a score of "4," is described more frequently than product $P_2$, with a score of "1."

Graphical representation 350 depicts concept data (cells 358) extracted from multiple documents ($D_1$-$D_M$) according to yet another implementation. Similar to graphical representation 300, in graphical representation 350 the rows 352 represent individual documents ($D_1$-$D_M$), and the concept data 358 is represented as binary data. However, graphical representation 350 illustrates a more detailed set of concept data, where the columns 354 represent individual concepts (e.g., products $P_1$-$P_N$) nested with sub-concepts associated with each concept (e.g., product features $P_iF_1$-$P_iF_n$). For example, product P1 may be a credit card associated with product features ($P_1F_1$-$P_1F_n$), such as fees, interest rate, credit limit, etc. Graphical representation 350 may, for example, represent context data obtained based on using multiple related libraries (e.g., libraries 104, 200) to extract context data from one or more documents.

Figure 4:
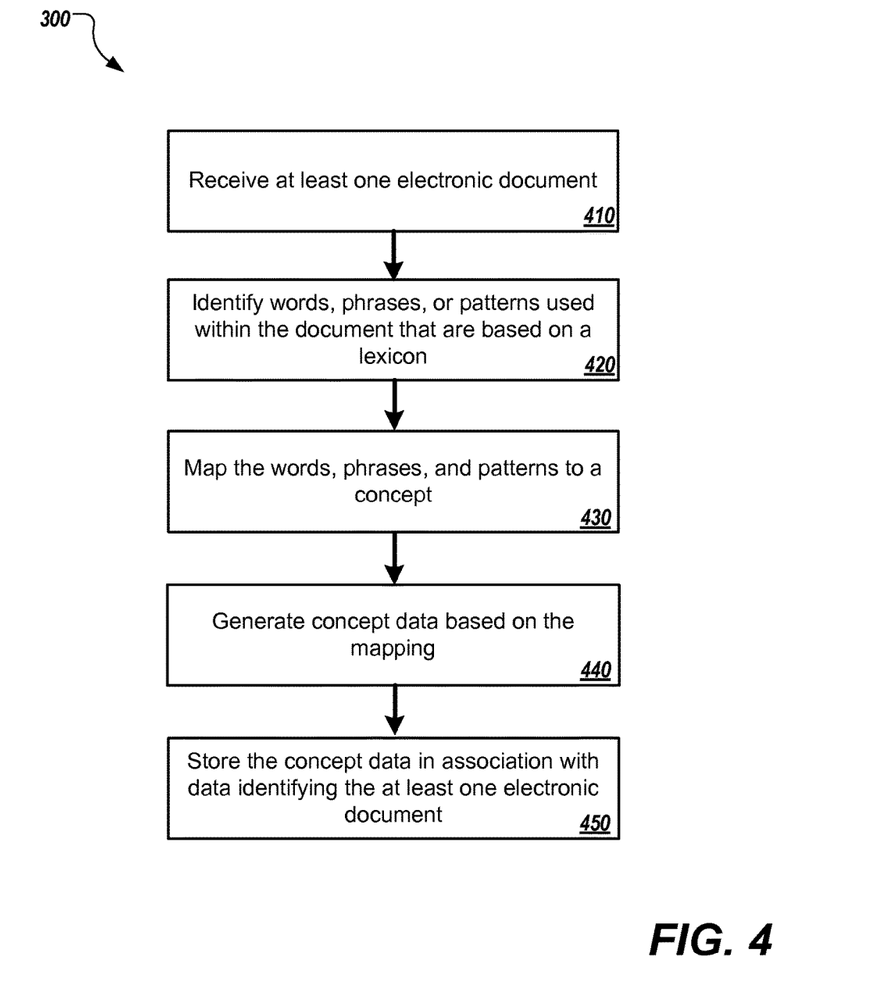
FIG. 4 depicts an example process that can be executed in accordance with implementations of the present disclosure.

FIG. 4 depicts an example process 400 that can be executed in accordance with implementations of the present disclosure. In some examples, the example process 400 can be provided as one or more computer-executable programs executed using one or more computing devices. In some examples, the process 400 is executed to extract concepts conveyed within one or more electronic textual documents using one or more different lexicons.

At least one electronic document is received by a computing device (410). Electronic documents may include any type of electronic text document, including but not limited to, word processor files, portable document files, e-mails, chat conversations, speech to text transcriptions, or website or user application text entry forms, for example.

One or more words, phrases, or patterns that are used within the electronic document and that are based on a lexicon are identified within the electronic document (420). For example, a particular word, phrase, or pattern of words may be used within lexicon A to describe concept X, while a different word, phrase or pattern of words may be used within lexicon B to describe the same concept X. For example, the lexicon may be one of a customer lexicon, a customer service representative lexicon, a legal staff lexicon, a marketing staff lexicon, or a technical staff lexicon. In some examples, known sets of one or more words, phrases, or patterns corresponding to one or more known lexicons may be identified within the electronic document.

The one or more words, phrases, or patterns are mapped using a concept library to a concept intended to be conveyed by the one or more words, phrases, or patterns in the lexicon (430). For example, the concept library may include at least one lexicon having a plurality of context entries. Each context entry of the concept library may include a set of one or more words, phrases, or patterns that are mapped to at least one concept which is intended to be conveyed, according to the respective lexicon, by the set of one or more words, phrases, or patterns that are included in the respective context entry. In some examples, the concept library may be one of a product library, a product feature library, a line of business library, or a life events library. In other words, the concept library may map words, phrases, or patterns of words using in one or more lexicons to concept sets that include, but are not limited to, products, product features, lines of business, or life events.

Concept data is generated for the document based on the mapping (440), and the concept data is stored in association with data identifying the electronic document (450). The concept data may represent, at a high level, the concepts present in the electronic document the respective of the lexicon in which they are described in the document. In addition, the concept data may, in some implementations, reduce the computing resources required to compare, categorize, or search large groups of electronic documents. In some implementations, the concept data may include binary data associated with each concept represented in a concept library, and the binary data may indicate that a respective concept is either present or not present in an electronic document. In some implementations, the concept data may include a concept score for each concept represented in the concept library, and each concept score may indicate a frequency or strength with which each respective concept is conveyed in an electronic document. In some examples, the concept data may be stored in one or more databases on other persistent storage devices accessible through a network. In some implementations, the concept data may be stored in one or more cloud databases on other persistent storage devices accessible through a network.

Some implementations may permit a user to compare two or more electronic documents for similar concepts. For example, a graphical user interface (GUI) that allows a user to select two or more documents for comparison may be presented to a user. Upon receiving a user input selecting two or more documents to be compared, a set of concepts that are conveyed in both a first and a second electronic document may be determined based on comparing concept data associated with the first electronic document to concept data associated with the second electronic document. Then, in response to receiving the user request to compare the first and the second electronic document, the set of concepts that are conveyed in both a first and a second electronic document may be provided for display to the user, for example, within the GUI.

Some implementations may permit a user to compare two or more electronic documents for dissimilar concepts (e.g., contrast two or more documents). For example, a GUI that allows a user to select two or more documents for comparison may be presented to a user. Upon receiving a user input selecting two or more documents to be compared, a set of concepts that are conveyed in a first electronic document but that are not conveyed in a second electronic document based on comparing concept data associated with the first electronic document to concept data associated with the second electronic document. Then, in response to receiving the user request to compare the first and the second electronic document, the set of concepts that are conveyed in a first electronic document but that are not conveyed in a second electronic document, for example, within the GUI.

In some examples, concept data may be stored across multiple databases. In such situations a document index may be used identify storage locations for concept data associated with respective documents, enabling documents to be compared or contrasted across databases.

Some implementations may include a user selectable control that allows the user to choose whether to compare or contrast two or more documents. In other words, the user selectable may allow the user to determine whether the two or more documents are to be compared in order to identify similar concepts conveyed within the documents, or whether the documents are to be contrasted in order to identify concepts conveyed within one of the documents but not others.

In some implementations, a search index may be created based on concept data from a plurality of documents. A search engine may, for example, use the search index created based on the concept data to permit users to efficiently search a large group of electronic documents at a concept level as opposed searching documents using traditional keyword searches. In some implementations, multiple search indices may be created based on multiple sets of concept data. Further, the search indices and corresponding sets of concept data may be stored on separate databases or cloud databases. A search engine may, for example, perform concept level document searches on two or more of the search indices concurrently.

In some implementations, a document category index may be created based on concept data from a plurality of documents, thereby, allowing a large group of documents to be efficiently organized based on concepts described within the documents.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal; a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by one or more processors, the method comprising:
   receiving at least one electronic document;
   identifying, by the one or more processors, one or more words, phrases, or patterns used within the electronic document, the one or more words, phrases, or patterns based on a lexicon;
   mapping, by the one or more processors using a concept library, the one or more words, phrases, or patterns to a concept intended to be conveyed by the one or more words, phrases, or patterns according to the lexicon, wherein the concept library comprises two or more lexicons each having a plurality of context entries, each context entry comprising a first set of one or more words, phrases, or patterns from a first lexicon and a second set of one or more different words, phrases, or patterns from a second lexicon, wherein both the first set and second set are mapped to at least one common concept intended to be conveyed by the respective sets of one or more words, phrases, or patterns;
   generating, by the one or more processors, concept data based on the mapping; and
   storing the concept data associated with the electronic document in a concept index comprising concept data associated with at least one other electronic document that conveys respective concepts according to a different lexicon from the lexicon of the at least one electronic document, the concept index comprising, for each electronic document represented in the concept index, an array of values where each value indicates a presence or absence of a given concept within a respective document irrespective of a particular lexicon used to convey the concept within the document.

2. The method of claim 1, wherein the concept library is one of a product library, a product feature library, a line of business library, or a life events library.

3. The method of claim 1, wherein the lexicon is one of a customer lexicon, a customer service representative lexicon, a legal staff lexicon, a marketing staff lexicon, or a technical staff lexicon.

4. The method of claim 1, wherein the values in the array of values comprise binary data associated with each concept represented in the concept library, the binary data indicating that a respective concept is either present or not present in the respective electronic document.

5. The method of claim 1, wherein the values in the array of values comprise a concept score for each concept represented in the concept index, each concept score indicating a frequency with each respective concept is conveyed in the respective electronic document.

6. The method of claim 1, further comprising:
   determining, using the concept index, a set of concepts that are conveyed in both a first and a second electronic document based on comparing values from a concept data array associated with the first electronic document to values from a concept data array associated with the second electronic document; and
   in response to receiving a user request to compare the first and the second electronic document, providing, for display to the user, the set of concepts that are conveyed in both the first and the second electronic document.

7. The method of claim 1, further comprising:
   determining, using the concept index, a set of concepts that are conveyed in a first electronic document but that are not conveyed in a second electronic document based on comparing values from a concept data array associated with the first electronic document to values from a concept data array associated with the second electronic document; and
   in response to receiving a user request to compare the first and the second electronic document, providing, for display to the user, the set of concepts that are conveyed in the first electronic document but that are not conveyed in the second electronic document.

8. A system comprising:
   at least one processor; and
   at least one data store coupled to the at least one processor having instructions stored thereon which, when executed by the at least one processor, causes the at least one processor to perform operations comprising to perform operations comprising:
   receiving at least one electronic document;
   identifying one or more words, phrases, or patterns used within the electronic document, the one or more words, phrases, or patterns based on a lexicon;

mapping, using a concept library, the one or more words, phrases, or patterns to a concept intended to be conveyed by the one or more words, phrases, or patterns according to the lexicon, wherein the concept library comprises two or more lexicons each having a plurality of context entries, each context entry comprising a first set of one or more words, phrases, or patterns from a first lexicon and a second set of one or more different words, phrases, or patterns from a second lexicon, wherein both the first set and second set are mapped to at least one common concept intended to be conveyed by the respective sets of one or more words, phrases, or patterns;

generating concept data based on the mapping; and storing the concept data associated with the electronic document in a concept index comprising concept data associated with at least one other electronic document that conveys respective concepts according to a different lexicon from the lexicon of the at least one electronic document, the concept index comprising, for each electronic document represented in the concept index, an array of values where each value indicates a presence or absence of a given concept within a respective document irrespective of a particular lexicon used to convey the concept within the document.

9. The system of claim 8, wherein the concept library is one of a product library, a product feature library, a line of business library, or a life events library.

10. The system of claim 8, wherein the lexicon is one of a customer lexicon, a customer service representative lexicon, a legal staff lexicon, a marketing staff lexicon, or a technical staff lexicon.

11. The system of claim 8, wherein the values in the array of values comprise binary data associated with each concept represented in the concept library, the binary data indicating that a respective concept is either present or not present in the respective electronic document.

12. The system of claim 8, wherein the values in the array of values comprise a concept score for each concept represented in the concept index, each concept score indicating a frequency with each respective concept is conveyed in the respective electronic document.

13. The system of claim 8, wherein the operations further comprise:

determining, using the concept index, a set of concepts that are conveyed in both a first and a second electronic document based on comparing values from a concept data array associated with the first electronic document to values from a concept data array associated with the second electronic document; and in response to receiving a user request to compare the first and the second electronic document, providing, for display to the user, the set of concepts that are conveyed in both the first and the second electronic document.

14. The system of claim 8, wherein the one or more processors are further configured to perform operations comprising:

determining, using the concept index, a set of concepts that are conveyed in a first electronic document but that are not conveyed in a second electronic document based on comparing values from a concept data array associated with the first electronic document to values from a concept data array associated with the second electronic document; and in response to receiving a user request to compare the first and the second electronic document, providing, for display to the user, the set of concepts that are conveyed in the first electronic document but that are not conveyed in the second electronic document.

15. A non-transitory computer readable medium storing instructions that, when executed by one or more processors, cause the one or more processors to perform operations comprising:

receiving at least one electronic document;

identifying one or more words, phrases, or patterns used within the electronic document, the one or more words, phrases, or patterns based on a lexicon;

mapping, using a concept library, the one or more words, phrases, or patterns to a concept intended to be conveyed by the one or more words, phrases, or patterns according to the lexicon, wherein the concept library comprises two or more lexicons each having a plurality of context entries, each context entry comprising a first set of one or more words, phrases, or patterns from a first lexicon and a second set of one or more different words, phrases, or patterns from a second lexicon, wherein both the first set and second set are mapped to at least one common concept intended to be conveyed by the respective sets of one or more words, phrases, or patterns;

generating concept data based on the mapping; and storing the concept data associated with the electronic document in a concept index comprising concept data associated with at least one other electronic document that conveys respective concepts according to a different lexicon from the lexicon of the at least one electronic document, the concept index comprising, for each electronic document represented in the concept index, an array of values where each value indicates a presence or absence of a given concept within a respective document irrespective of a particular lexicon used to convey the concept within the document.

16. The medium of claim 15, wherein the operations further comprise:

determining, using the concept index, a set of concepts that are conveyed in both a first and a second electronic document based on comparing values from a concept data array associated with the first electronic document to values from a concept data array associated with the second electronic document; and in response to receiving a user request to compare the first and the second electronic document, providing, for display to the user, the set of concepts that are conveyed in both the first and the second electronic document.

17. The medium of claim 15, wherein the operations further comprise:

determining, using the concept index, a set of concepts that are conveyed in a first electronic document but that are not conveyed in a second electronic document based on comparing values from a concept data array associated with the first electronic document to values from a concept data array associated with the second electronic document; and in response to receiving a user request to compare the first and the second electronic document, providing, for display to the user, the set of concepts that are conveyed in the first electronic document but that are not conveyed in the second electronic document.

18. The medium of claim 15, wherein the concept library is one of a product library, a product feature library, a line of business library, or a life events library.

19. The medium of claim 15, wherein the values in the array of values comprise binary data associated with each concept represented in the concept library, the binary data indicating that a respective concept is either present or not present in the respective electronic document.

20. The medium of claim 15, wherein the values in the array of values comprise a concept score for each concept represented in the concept index, each concept score indicating a frequency with each respective concept is conveyed in the respective electronic document.

* * * * *